United States Patent [19]

Miyazaki et al.

[11] Patent Number: 5,712,064
[45] Date of Patent: Jan. 27, 1998

[54] PROCESS FOR PRODUCING A COLOR FILTER AND A LIQUID CRYSTAL DISPLAY DEVICE

[75] Inventors: Takeshi Miyazaki, Ebina; Hiroshi Sato, Yokohama; Katsuhiro Shirota, Kawasaki; Hideto Yokoi; Akio Kashiwazaki, both of Yokohama; Shoji Shiba, Sagamihara, all of Japan

[73] Assignee: Canon Kabushiki Kaisha, Tokyo, Japan

[21] Appl. No.: 494,076

[22] Filed: Jun. 23, 1995

[30] Foreign Application Priority Data

Jun. 24, 1994 [JP] Japan .................................. 6-143197

[51] Int. Cl.$^6$ ............................ G02B 5/20; G02F 1/1335
[52] U.S. Cl. ............................ 430/7; 427/164; 347/100; 347/107; 349/106
[58] Field of Search ........................ 430/7; 427/164, 427/165, 256, 287, 511, 541; 347/100, 107; 349/106

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,418,284 | 11/1983 | Ogawa et al. | 250/578 |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |

(List continued on next page.)

FOREIGN PATENT DOCUMENTS

| | | |
|---|---|---|
| 0371398 | 6/1990 | European Pat. Off. . |
| 0400738 | 12/1990 | European Pat. Off. . |
| 0440095 | 8/1991 | European Pat. Off. . |
| 0531106 | 3/1993 | European Pat. Off. . |
| 0552035 | 7/1993 | European Pat. Off. . |
| 54-056847 | 5/1979 | Japan . |
| 01235903 | 9/1982 | Japan . |
| 59-123670 | 7/1984 | Japan . |
| 59-138461 | 8/1984 | Japan . |
| 60-71260 | 4/1985 | Japan . |
| 61-77014 | 4/1986 | Japan . |
| 63-294503 | 12/1988 | Japan . |
| 01217320 | 8/1989 | Japan . |
| 21073703 | 7/1990 | Japan . |
| 02228605 | 9/1990 | Japan . |
| 0310220 | 1/1991 | Japan . |
| 04317007 | 11/1992 | Japan . |
| 04349401 | 12/1992 | Japan . |
| 5-002106 | 1/1993 | Japan . |
| 5-005802 | 1/1993 | Japan . |
| 5-119211 | 5/1993 | Japan . |
| 05173010 | 7/1993 | Japan . |
| 5-224007 | 9/1993 | Japan . |
| 05288913 | 11/1993 | Japan . |
| 93 24240 | 12/1993 | WIPO . |

OTHER PUBLICATIONS

Patent Abstracts of Japan, vol. 17, No. 526 (Sep. 1993) (P–1617).
Patent Abstracts of Japan, vol. 17, No. 703 (Dec. 1993) (P–1666).
Patent Abstracts of Japan, vol. 8, No. 183 (Aug. 1984) (P–296).
Patent Abstracts of Japan, vol. 13, No. 37 (Jan. 1989) (P–819).
Patent Abstracts of Japan, vol. 13, No. 530 (Nov. 1989) (P–966).
Patent Abstracts of Japan, vol. 16, No. 382 (Aug. 1992) (P–1403).
Patent Abstracts of Japan, vol. 16, No. 197 (May 1992) (P–1350).

*Primary Examiner*—John A. McPherson
*Attorney, Agent, or Firm*—Fitzpatrick, Cella, Harper & Scinto

[57] ABSTRACT

A color filter is provided which has picture elements arranged adjacently on a substrate, each picture element comprising a red segmental layer, a green segmental layer, and a blue segmental layer, wherein at least one color of the segmental layers is colored with a dye, and at least one of the other colors of the segmental layers is colored with a pigment.

22 Claims, 5 Drawing Sheets

U.S. PATENT DOCUMENTS

| | | | |
|---|---|---|---|
| 4,608,577 | 8/1986 | Hori | 346/140 R |
| 4,698,113 | 10/1987 | Ogawa | 156/275.7 |
| 4,723,129 | 2/1988 | Endo et al. | 346/1.1 |
| 4,740,796 | 4/1988 | Endo et al. | 346/1.1 |
| 4,818,075 | 4/1989 | Takao et al. | 350/339 F |
| 4,846,556 | 7/1989 | Haneda | 350/317 |
| 4,864,324 | 9/1989 | Shirota et al. | 346/1.1 |
| 4,965,612 | 10/1990 | Sakaki et al. | 346/1.1 |
| 4,981,614 | 1/1991 | Miyazaki et al. | 252/587 |
| 4,995,705 | 2/1991 | Yoshinaga et al. | 350/350 |
| 5,011,623 | 4/1991 | Yoshinaga et al. | 252/299.5 |
| 5,039,208 | 8/1991 | Ohnishi et al. | 359/100 |
| 5,079,214 | 1/1992 | Long et al. | 503/227 |
| 5,159,349 | 10/1992 | Endo et al. | 346/33 A |
| 5,190,794 | 3/1993 | Yoshino et al. | 427/162 |
| 5,278,009 | 1/1994 | Iida et al. | 430/7 |
| 5,281,450 | 1/1994 | Yaniv | 427/530 |
| 5,317,434 | 5/1994 | Ohara | 359/68 |
| 5,340,619 | 8/1994 | Chen et al. | 427/165 |
| 5,358,558 | 10/1994 | Yamamoto et al. | 106/22 R |
| 5,374,493 | 12/1994 | Fukunaga et al. | 430/7 |
| 5,418,094 | 5/1995 | Sato et al. | 430/7 |
| 5,420,708 | 5/1995 | Yokoyama et al. | 359/67 |

PROCESS FOR PRODUCING A COLOR FILTER AND A LIQUID CRYSTAL DISPLAY DEVICE

BACKGROUND OF THE INVENTION

1. Field of the Invention

The present invention relates to a color filter for a liquid crystal display, a process for producing the liquid crystal display, and a liquid crystal display device employing the color filter.

2. Related Background Art

Generally, liquid crystal display devices are employed for various uses such as personal computers, word processors, automobile navigation systems, and miniature television. The demand therefor is increasing in recent years. Correspondingly, reduction of the production cost thereof is strongly desired.

The color filter for the liquid crystal display device is constituted of an arrangement of a number of picture elements comprising respectively color segmental layers of red (R), green (G), or blue (B), and light-intercepting black matrixes in the peripheries of the color segmental layers to increase the display contrast. The respective color segmental layers of the color filters comprises a coloring material which selectively transmits R, G, or B. The coloring material includes dyes and pigments. Pigments are widely used since the pigments are more durable.

The colored picture element portions of the color filter are formed by dying, pigment dispersion, pigment electrodeposition, or a like method.

To meet the demand for the cost reduction of the color filter, printing methods and ink-jet methods are proposed for formation of the colored picture element portions. The printing methods, however, involve steps of transfer of a coloring matter from a printing plate and drying of the printed matter for each of the colors of R, G, and B repeatedly, namely three times. The production efficiency of printing methods is disadvantageously poor.

In the ink-jet methods, on the other hand, three coloring liquids containing a coloring matter of R, G, or B are ejected on a substrate by an ink-jet method, and the deposited coloring inks are dried to form colored picture element portions, as shown, for instance, in Japanese Patent Application Laid-Open No. 59-75205. The ink-jet method enables simultaneous formation of picture elements of R, G, and B, thereby simplifying the production process greatly and reducing the production cost remarkably.

In formation of color layers with ink dots by ink-jet method, color mixing is liable to occur at the boundaries between different colors of color segmental layers. In particular this phenomenon is remarkable when the gaps between the color segmental layers are narrowed. The color mixing between the different colors of the color segmental layers impairs the image quality of the liquid crystal panel, and lowers the yield of the filter to raise the production cost. Therefore, the ink-jet method requires broad gaps between the segmental color layers such that the color mixing is not caused. This makes it difficult to increase the number of picture elements in a certain area to raise the fineness of the image.

The use of a pigment improves the heat resistance and the lightfastness of the filter. However, the pigment dissolves the light polarization effect owing to its light scattering more remarkable than dyes to lower the image contrast of the liquid crystal panel.

SUMMARY OF THE INVENTION

It was found by the inventors of the present invention, after comprehensive investigation, that the color mixing is less liable to occur at the boundaries between a dye-colored segmental layer and a pigment-colored segmental layer because of the hydrophilic property of the dye and the hydrophobic property of the pigment. The present invention has been accomplished on the basis of the above findings.

An object of the present invention is to provide a color filter which is free from the above disadvantages, causes less color mixing at the boundary between the segmental color layers, and is capable of forming finer images.

Another object of the present invention is to provide a process for producing the above color filter.

A further object of the present invention is to provide a liquid crystal display device giving images of high quality, employing the above color filter.

The above objects can be achieved by the present invention described below.

According to the present invention, there is provided a color filter having picture elements arranged adjacently on a substrate, each picture element comprises a red segmental layer, a green segmental layer, and a blue segmental layer, wherein at least one color of the segmental layers is colored with a dye, and at least one of the other colors of the segmental layers is colored with a pigment.

According to the present invention, there is also provided a process for producing a color filter comprising conducting at least once the steps of ejecting a red color liquid, a green color liquid, and a blue color liquid respectively through a corresponding nozzle to deposit the color liquids onto prescribed spots on a substrate, and drying the deposited liquid; at least one of the red color liquid, the green color liquid, and the blue color liquid being colored with a dye, and at least one of the other color liquids being colored with a pigment.

According to the present invention, there is further provided a liquid display device comprising a liquid crystal panel having a liquid crystal layer between the above color filter and the substrate counterposed to the color filter.

The present invention enables production of color filter with finer arrangement of picture elements since the color mixing is less liable to be caused by feathering of ink dots at the boundaries of the color segmental layers of red, green, and blue, and color mixing-prevention barriers need to be formed only at the boundaries between the pigment-colored segmental layers and between the dye-colored segmental layers, thereby enabling production of liquid display device with fine image quality.

DESCRIPTION OF THE PREFERRED EMBODIMENTS

The present invention is described below in detail by reference to the drawings.

Figure 4:
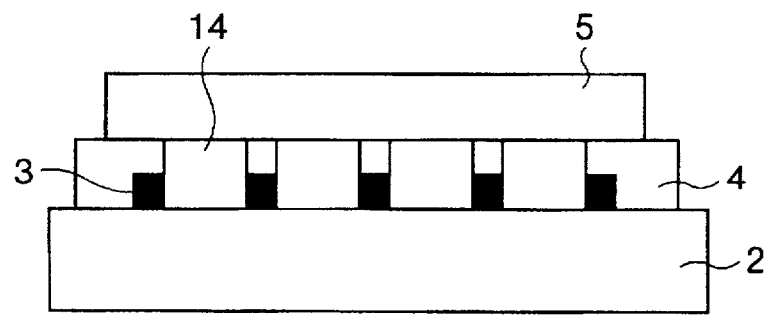
FIG. 4 is a schematic partial cross-sectional view of one embodiment of the color filter of the present invention.

FIG. 4 illustrates an example of the color filter for a liquid display of the present invention, comprising a light-transmissive substrate 2, a black matrix 3 composed of a metal or a black resist, a subbing layer 4, a passivation layer 5, and color segmental layers 14.

The light-transmissive substrate 2 in the filter of FIG. 4 is generally made of glass. However, any other material including plastics may be employed provided that it has necessary properties such as light-transmissivity and mechanical strength.

The color liquids are ejected respectively in a form of liquid droplets through an ink-jet recording head onto the light-transmissive substrate 2, and dried to form respective color segmental layers. On the receiving layer for the color liquids, a subbing layer 4 composed of an ink-absorbent resin or the like may be formed at the colored portions for improving the fixability of the color liquids. The ink-absorbent resin includes polyvinyl alcohol, polyvinylpyrrolidone, cellulose derivatives such as hydroxypropylcellulose, water-soluble acrylic resins, and is applied on the portions to be colored in matrix or over the whole face of the substrate 2.

The light-transmissive substrate or the subbing layer may be covered with a passivation layer 5, if desired. The passivation layer may be formed from any material which is capable of giving a light-transmissive color filter and is stable in processes such as alignment film formation. The material for the passivation layer includes resin materials such as radiation-curing resins, heat-curing resins, and radiation-heat-curing resins, and inorganic materials formed by vapor deposition or sputtering.

When all of the three color segmental layers of R, G, and B in one picture element of a color filter comprise dyes, the color filter is less heat-resistant and less light-resistant, while when all of the three colored layers comprise pigments, light polarization is dissolved remarkably to result in lower contrast of the picture image. In the color filter of the present invention, at least one of the three color segmental layers of R, G, and B constituting one picture element is colored with a dye, and at least one of the other color segmental layers is colored with a pigment.

With the above-mentioned constitution of the color filter of the present invention, boundary portions are formed where a dye-colored segmental layer and a pigment-colored segmental layer are adjacent to each other within one picture element or between adjacent picture elements. In such boundary portions, color mixing is less liable to occur, and therefore color mixing-prevention barrier need not be provided even when the gaps at the boundary between the color segmental layers are made small. Accordingly, it is possible to make the gap between the color segmental layers smaller than that in conventional color filters for increasing the density of the picture elements to make the image finer. In conventional color filters, the gap (shortest distance) between the adjacent layers needs to be made larger than a certain dimension to prevent the color mixing, or a breadth for the color-mixing prevention barrier needs to be secured there to provide the barrier. Specifically the gap is conventionally not less than 40 µm. However, in the color filter of the present invention, the gap between the pigment-colored segmental layer and the dye-colored segmental layer can be made to be smaller, in the range of from 5 to 40 µm. Thereby the formed image can be made finer by increasing the picture elements per unit area.

Figure 1:
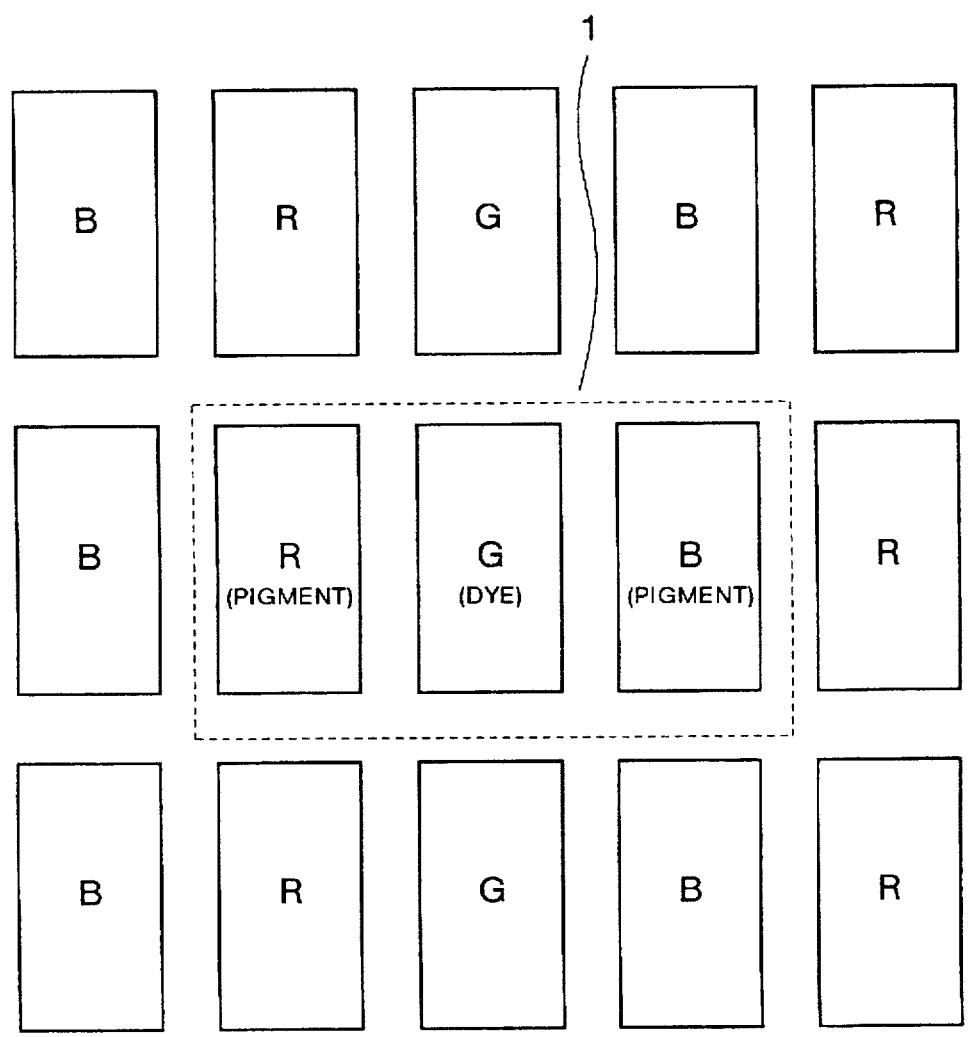
FIG. 1 is a schematic partial plan view of a color filter of the present invention having picture elements comprising respectively a pigment-colored segment layer of R, a dye-colored segmental layer of G, and a pigment-colored segmental layer of B.

Any one of the three kinds color segmental layers may be pigment-colored or dye-colored. In view of the image quality (contrast), G layers which exhibit the highest visual sensitivity are preferably colored with a dye. Further, when the G layers are colored with a dye which causes less dissolution of deflection, the B layers are preferably colored with a pigment since mixing of G and B impairs significantly the image quality. More preferably, the layers on both sides of the G layers are colored with pigments as shown in FIG. 1.

In view of the prevention of the color mixing, color mixing-prevention barriers are preferably formed at the boundaries between the colored layers. However, it limits the number of the picture elements in unit area, and is costly, disadvantageously. Therefore, the color mixing-prevention barriers are preferably formed between the dye-colored layers, and between the pigment-colored layers. For example, when the G layers are dye-colored and the R layers and the B layers are pigment-colored, the color mixing-prevention barriers are formed as shown in FIG. 2 (as indicated by the numeral 15).

Figure 2:
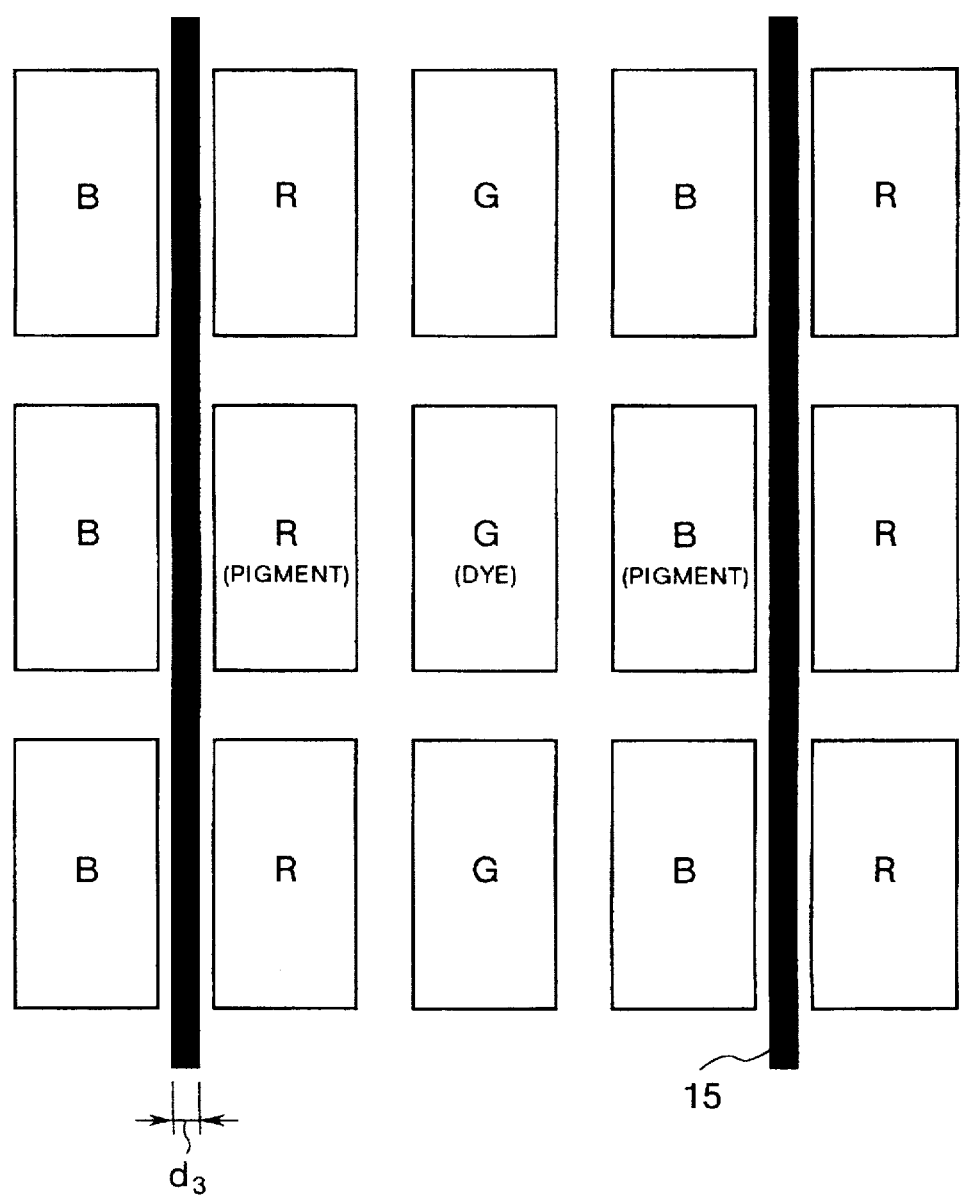
FIG. 2 is a schematic partial plan view of the color filter of FIG. 1 having color mixing-prevention barriers between the color layers of B and R.
Figure 3:
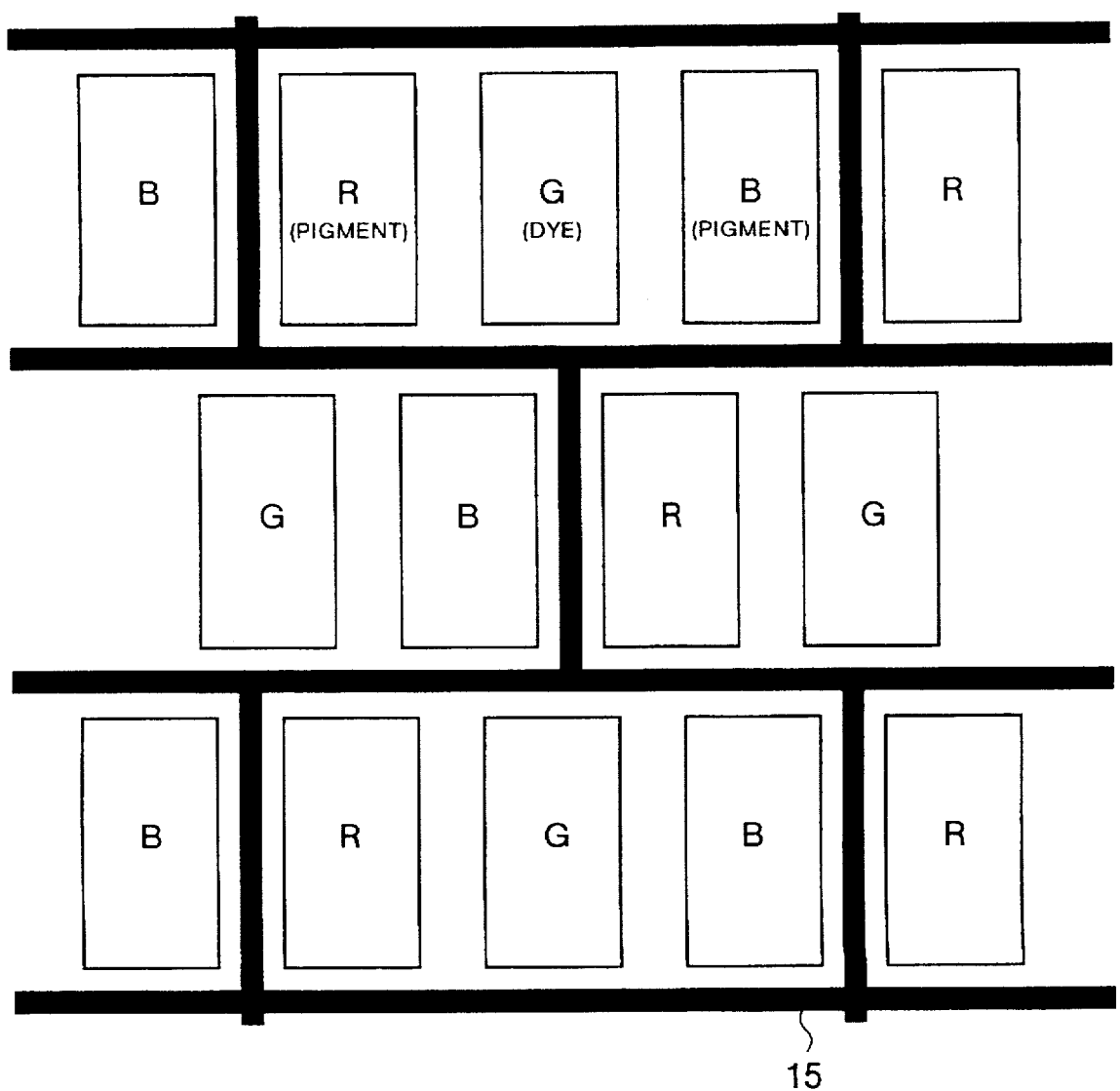
FIG. 3 is a schematic partial plan view of a color filter of the present invention in which the respective picture elements are partitioned with a color mixing-prevention barrier.

In the layer arrangement in FIG. 2, there are boundaries of two kinds of dye-colored layers and of two kinds of pigment-colored layers in the upside and the downside of the one picture element in the drawing. Therefore, one picture element may be surrounded as a block by the color mixing-prevention barrier as shown in FIG. 3.

Figure 5:
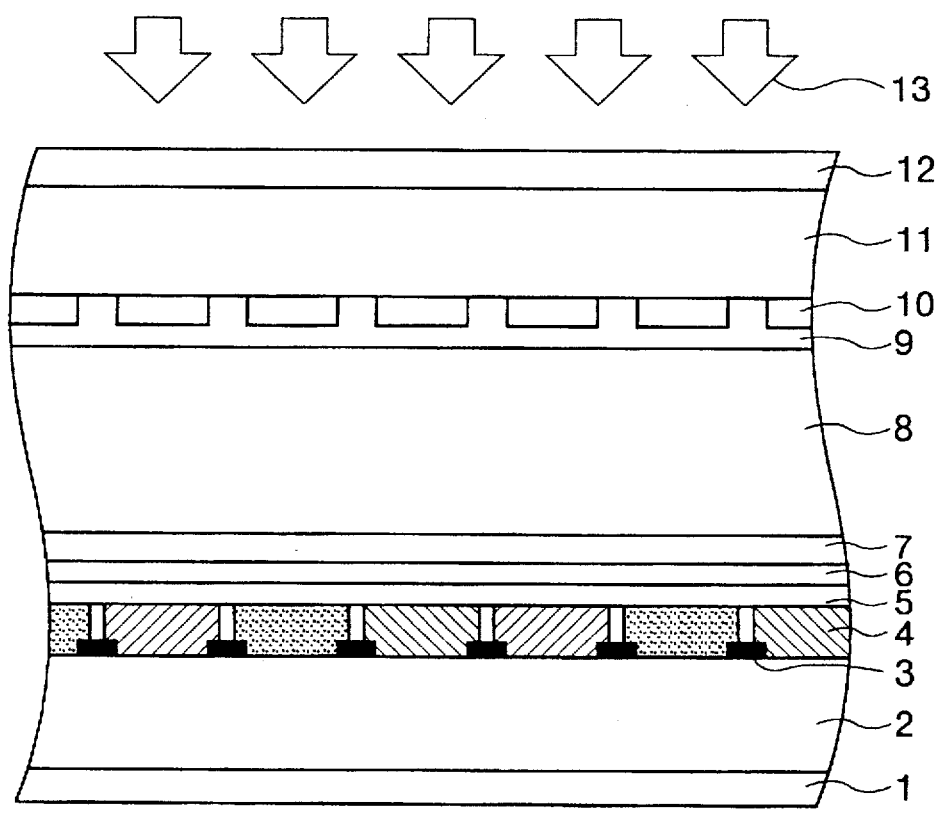
FIG. 5 is a schematic partial cross-sectional view of one embodiment of a liquid crystal panel having a color filter of the present invention.

FIG. 5 shows an example of a liquid crystal panel of the liquid crystal display device employing the color filter of the present invention. The liquid crystal panel comprises a polarizing plate 1, a light-transmissive substrate 2 like a glass plate, a black matrixes 3, a subbing layer 4, a passivation layer 5, a common electrode 6, an alignment film 7, a liquid crystal compound 8, an alignment film 9, picture element electrodes 10, a light-transmissive substrate 11, and a polarizing plate 12. The numeral 13 indicates back illumination light.

The liquid crystal panel generally comprises a liquid crystal compound sealed between a color filter and an opposing substrate, and light-transmissive element electrodes 10 are formed in matrix inside the substrate 11 opposing the color filter 1 to 7. At the spots opposing the element electrodes 10, the light-transmissive coloring materials of R, G, and B are arranged to construct the color filter.

At the inside of each of the substrates, an alignment films 7 and 9 are formed respectively. By rubbing treatment of the alignment films, the liquid crystal molecules are aligned in a prescribed direction. On the outside of each of the substrates, a polarizing plate is bonded respectively. The liquid crystal compound is filled between the above substrates. The light source of the back illumination light 13 is usually a combination of a fluorescent lamp and a light scattering plate (both not shown in the drawing). The display is conducted by utilizing the liquid crystal compound as a light shutter to vary the transmittance of the back illumination light 13.

The ink-jet recording head used for forming the color filter of the present invention preferably the one which ejects liquid droplets by thermal energy.

The construction and the principle of a typical ink-jet recording head are disclosed, for instance, in U.S. Pat. Nos.

4,723,129, and 4,740,796. This system is applicable to both on-demand type ones and continuous type ones. In the on-demand type ink-jet system, an electrothermal converters are placed for the sheets or a liquid pathway holding a liquid (ink), and a driving signal is applied to the electrothermal converter in correspondence with recording information to cause abrupt temperature rise of the liquid over the nucleus boiling temperature and to form bubbles of the liquid (ink) by film boiling in one-to-one correspondence with the driving signal. The liquid (ink) is ejected by growth and constriction of the bubble through an ejection opening to form at least one droplet. By application of driving signals in a pulse form, the bubble grows or constricts instantaneously and properly, thereby the liquid (ink) being ejected with high responsiveness desirably.

Suitable pulse signals are disclosed in U.S. Pat. Nos. 4,463,359, and 4,345,262. Further, the recording is improved more by employing the conditions shown in U.S. Pat. No. 4,313,124 which describes a temperature rising rate of the heating face.

The ink-jet recording head may be a combination of ejection openings, liquid pathways, and electrothermal converters (linear liquid pathways or rectangular liquid pathways) as disclosed in the above patent specifications, or may have a constitution such that the heating portions are placed in bending regions as disclosed in U.S. Pat. Nos. 4,558,333, and 4,459,600. The ink-jet recording head may have a common slit for liquid ejection portions for a plurality of electrothermal converters as disclosed in Japanese Patent Application Laid-Open No. 59-123670, or may have openings for absorbing pressure waves from the thermal energy for the election openings as shown in Japanese Patent Application Laid-Open No. 59-138461.

The full-line recording for the maximum possible recording width of a recording apparatus may be conducted with a combination of a plurality of recording heads described above or with one recording head formed integrally.

The ink-jet recording head may be a exchangeable chip type one which is connected electrically to the main recording apparatus on setting thereto and is ready to receive ink simultaneously, or may be a cartridge type one which comprises an ink head and an ink tank integrally.

Furthermore, a recovery means for the ink-jet recording head, and other supplemental auxiliary means are preferably provided in the constitution of the recording apparatus for stabilizing the ink ejection. The additional means specifically include a capping means, a cleaning means, and a pressure-applying or sucking means for the recording head, a supplemental heating means for the electrothermal converter or other heating elements or combination thereof, and a means for conducting a preliminary election mode.

The coloring liquids, namely the inks, employed in the present invention are not limited to the inks which are liquid at an ordinary temperature, but may be an ink which is solid at room temperature or below, an ink which soften at room temperature, or an ink which become liquid at the time of recording signal application conducted usually in an ink temperature range of from 30° to 70° C. for stable ink ejection.

In the present invention, the ink in a solid state at room temperature is applicable which is liquified by application of thermal energy in correspondence with recording signals to be ejected is ejected in a state of liquid and comes to be solidified on reaching the substrate. Such a solid ink is effective for prevention of overheating of ink by utilizing the latent heat of melting, or for prevention of evaporation of the ink. The solid ink may be held in concave portions or through-holes in a porous sheet in opposition to the electrothermal converter as described in Japanese Patent Application Laid-Open Nos. 54-56847 and 60-71260. The most effective is the system utilizing the aforementioned film boiling.

The present invention is described below specifically by reference to examples.

EXAMPLE 1

Formation of Black Matrix

Figure 6:
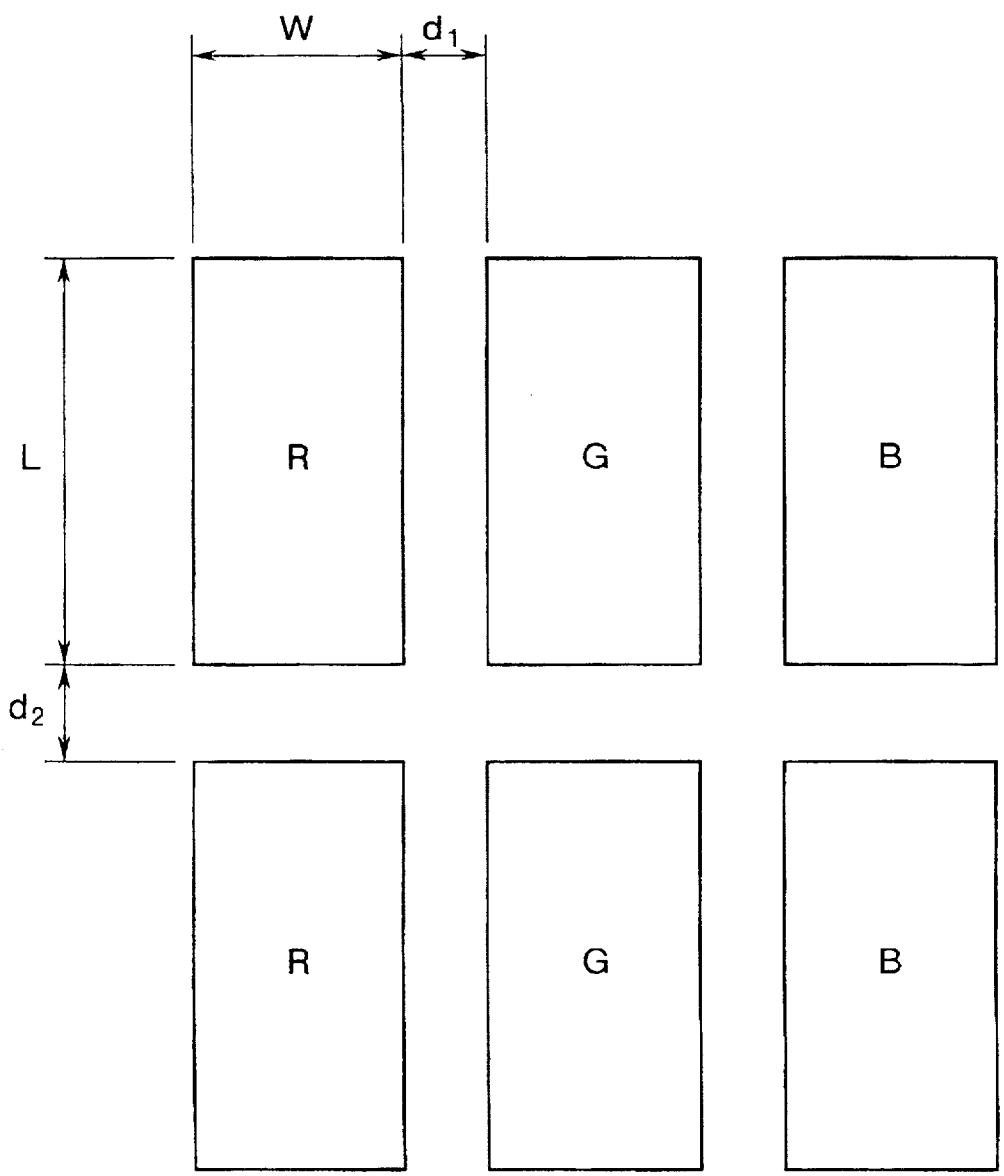
FIG. 6 is a schematic partial cross-sectional view showing constitution of the picture elements of the color filter of Example 1.

On a glass substrate composed of no-alkali glass and having been polished at the surface, a thin film of chromium (Cr) was formed by sputtering in a thickness of about 2000 Å in a size of 200 mm square. The thin film was patterned as shown in FIG. 6 by photolithography. In the matrix pattern of FIG. 6, W is 60 μm, L is 140 μm, $d_1$ is 20 μm, and $d_2$ is 100 μm.

Formation of Subbing Layer

Onto the glass substrate having the above black matrix, a resin composition composed of hydroxypropylcellulose (HPC-H, produced by Nippon Soda Co., Ltd.) was applied by spin coating, and was dried at 90° C. for 10 minutes to form a subbing layer of 2 μm thick.

Preparation of Coloring Inks

Inks of R (red), G (green), and B (blue) were respectively prepared which had compositions as shown in Table 1 below.

TABLE 1

| Coloring material | Component | Parts (%) by weight |
|---|---|---|
| Red Ink | | |
| Pigment | Red pigment *1 | 5.5 |
| | Monoethanolamine salt of styrene-maleic acid resin (average molecular weight: 30000, acid value: 300) | 0.6 |
| | Ethylene glycol | 30 |
| | Water | 63.9 |
| Green Ink | | |
| Dye | Green Dye *2 | 4.1 |
| | Ethylene glycol | 20 |
| | Isopropyl alcohol | 5 |
| | Water | 70.9 |
| Blue Ink | | |
| Pigment | Blue pigment *3 | 4.8 |
| | Monoethanolamine salt of styrene-maleic acid resin | 0.6 |
| | Ethylene glycol | 25 |
| | Isopropyl alcohol | 3 |
| | Water | 66.6 |

*1 Mixture of C.I. Pigment Red 168 and C.I. Pigment Orange 36 (mixing ratio: 23:8)
*2 Mixture of C.I. Acid Blue 9 and C.I. Acid Yellow 23 (mixing ratio: 7:2)
*3 Mixture of C.I. Pigment Blue 60 and C.I. Pigment Violet 23 (mixing ratio: 9:2)

Printing

The above inks are ejected from an ink-jet head into the apertures of the black matrix on the glass substrate kept at 50° C. sequentially for the colors of R, G, and B. The volume of the ink droplet was 45 pl, and the average diameter of the ink dots formed as the color segmental layers was 82 μm.

After the image printing, the printed matter was prebaked at 90° C. for 10 minutes, and then baked at 200° C. for 30 minutes.

Formation of Passivation Layer

On the resulting color segmental layers having a pattern of R, G, and B, a thermosetting resin (Hicoat LC-2001, produced by Sanyo Chemical Industries, Ltd.) was applied by spinner coating to give a dry thickness of 0.5 μm, and preliminarily baked at 120° C. for 30 minutes, and then baked at 200° C. for 30 minutes to form a passivation layer. Thereby a color filter was completed.

Preparation of Liquid Crystal Panel

A color liquid crystal display device as shown in FIG. 3 was prepared by using the above color filter through the steps of ITO membrane formation, alignment film formation, enclosing of a liquid crystal material, etc.

EXAMPLE 2

On a glass substrate having a black matrix and a subbing layer thereon prepared in the same manner as in Example 1. Printing was conducted with the inks of R, G, and B having the compositions shown in Table 2.

TABLE 2

| Coloring material | Component | Parts (%) by weight |
|---|---|---|
| Red Ink | | |
| Dye | Red Dye *1 | 4.5 |
| | Ethylene glycol | 20 |
| | Isopropyl alcohol | 5 |
| | Water | 70.5 |
| Green Ink | | |
| Dye | Green Dye *2 | 4.1 |
| | Ethylene glycol | 20 |
| | Isopropyl alcohol | 5 |
| | Water | 70.9 |
| Blue Ink | | |
| Pigment | Blue pigment *3 | 4.8 |
| | Monoethanolamine salt of styrene-maleic acid resin | 0.6 |
| | Ethylene glycol | 25 |
| | Isopropyl alcohol | 3 |
| | Water | 66.6 |

*1 Mixture of C.I. Acid Red 35 and C.I. Acid Yellow 23 (mixing ratio: 11:3)
*2 Mixture of C.I. Acid Blue 9 and C.I. Acid Yellow 23 (mixing ratio: 7:2)
*3 Mixture of C.I. Pigment Blue 60 and C.I. Pigment Violet 23 (mixing ratio: 9:2)

The above inks are ejected from an ink-jet head into the apertures of the black matrix on the glass substrate. The volume of the ink droplet was 45 pl, and the average diameter of the ink dots formed as the color segmental layers was 82 μm.

After the printing, the printed matter was prebaked at 90° C. for 10 minutes, and then baked at 200° C. for 30 minutes. Then a passivation layer was formed to prepare a color filter, and therewith a liquid crystal panel was prepared in the same manner as in Example 1.

EXAMPLE 3

A liquid crystal panel was prepared through steps of printing, passivationlayer formation, etc. in the same manner as in Example 1 except that the blue ink was changed to the one which was colored with a dye as shown in Table 3 below.

TABLE 3

| Coloring material | Component | Parts (%) by weight |
|---|---|---|
| Blue Ink | | |
| Dye | Blue dye *1 | 5.0 |
| | Ethylene glycol | 20 |
| | Isopropyl alcohol | 5 |
| | Water | 70.0 |

*1 Mixture of C.I. Acid Blue 9 and C.I. Acid Red 35 (mixing ratio: 9:1)

EXAMPLE 4

A liquid crystal panel was prepared through steps of printing, passivation layer formation, etc. in the same manner as in Example 1 except that the red ink was changed to the one of Example 2, and the green ink was changed to the one shown in Table 4 below.

TABLE 4

| Coloring material | Component | Parts (%) by weight |
|---|---|---|
| Green Ink | | |
| Pigment | Green pigment *1 | 5.2 |
| | Monoethanolamine salt of styrene-maleic acid resin (average molecular weight: 30000, acid value: 300) | 0.6 |
| | Ethylene glycol | 30 |
| | Water | 64.2 |

*1 Mixture of C.I. Pigment Green 36 and C.I. Pigment Yellow 83 (mixing ratio: 15:4)

EXAMPLE 5

A liquid crystal panel was prepared through steps of printing, passivation layer formation, etc. in the same manner as in Example 1 except that the green ink was changed to the one of Example 4, and the blue ink was changed to the one of Example 3.

EXAMPLE 6

A liquid crystal panel was prepared through the steps of printing, passivation layer formation, etc. in the same manner as in Example 1 except that the red ink was changed to the one of Example 2, the green ink was changed to the one of Example 4, and the blue ink was changed to the one of Example 3.

EXAMPLE 7

On a glass substrate, a black matrix was formed in the same manner as in Example 1. Thereon, a silicone primer AP-133 (produced by Nippon Unicar Co., Ltd.) was applied by spin coating, and was dried at 100° C. for 10 minutes to form a subbing layer of 0.2 μm thick.

A negative resist SNR (produced by Tosoh Corporation) was applied thereon by spin coating to obtain a dry film thickness of 0.5 μm, and prebaked at 90° C. for 20 minutes. Then a resist pattern was formed by irradiating the matrix with a patterning light through a photomask having apertures narrower than the width of the black resist at an exposure intensity of 150 mJ/cm$^2$.

The resist pattern serving as the color mixing-prevention barrier was formed, as shown in FIG. 2, only at the boundaries between the red color portions (R) and the blue color portions (B) with the width $d_3$ of 15 μm.

The inks having the same composition as the ones in Example 1 are ejected from an ink-jet head into the apertures of the black matrix. The volume of the ink droplet was 45 pl, and the average diameter of the ink dots formed as the colored segmental layers was 78 μm.

After the printing, the printed matter was prebaked at 90° C. for 10 minutes, and then baked at 200° C. for 30 minutes. Then a passivation layer was formed to prepare a color filter, and therewith a liquid crystal display apparatus was prepared in the same manner as in Example 1.

COMPARATIVE EXAMPLE 1

A liquid crystal display device was prepared by conducting printing, passivation layer formation in the same manner as in Example 1 except that the red ink was the one of Example 2, the green ink was the one of Example 1, and the blue ink was the one of Example 3, all the three inks being dye-colored.

COMPARATIVE EXAMPLE 2

A liquid crystal display device was prepared by conducting printing, passivation layer formation in the same manner as in Example 1 except that the red ink was the one of Example 1, the green ink was the one of Example 4, and the blue ink was the one of Example 1, all the three inks being pigment-colored.

Evaluation (Color-mixing among R, G, and B)

The colored picture image portions of the color filters prepared in the above Examples 1 to 7 and Comparative Examples 1 and 2 were examined with a microscope. The microscopic examination was conducted for an area of 2500 colored picture elements (50 lines ×50 columns) of each of the color filters. The color filter with 10 or more color-mixing defective spots was evaluated to be "poor"; the one with 3 to 9 color-mixing defective spots to be "fair"; the one with 1 to 2 color-mixing defective spots to be "good"; and the one without color-mixing defect to be "excellent". The evaluation results are shown in Table 5 below.

TABLE 5

|  | Absence of color-mixing |
| --- | --- |
| Example 1 | Excellent |
| Example 2 | Good |
| Example 3 | Good |
| Example 4 | Good |
| Example 5 | Good |
| Example 6 | Good |
| Example 7 | Excellent |
| Comparative example 1 | Fair |
| Comparative example 2 | Poor |

As shown in Table 5 above, the color filter prepared according to the present invention has less defects of color-mixing than conventional ones (Comparative Examples 1 and 2), and the effect was remarkable in Examples 1 and 7.

As described above, the present invention has advantages: (1) diminution of the defects of color-mixing caused by running of inks between the colored segmental layers of R, G, and B, and (2) possibility of finer image formation because the color-mixing prevention barriers are required only at the boundaries between pigment-colored segmental layers and between dye-colored segmental layers. Thereby the present invention gives a color filter which is suitable for finer image formation, and enables production of a liquid crystal display device giving high-quality images.

What is claimed is:

1. A process for producing a color filter, comprising the steps of:

applying a red color liquid, a green color liquid, and a blue color liquid onto prescribed spots on a substrate by ink-jet printing; and drying the deposited liquid to form a pattern of red, green and blue colors, wherein at least one of the red color liquid, the green color liquid and the blue color liquid contains a dye, and at least one other of the red color liquid, green color liquid and blue color liquid contains a pigment.

2. The process according to claim 1, wherein the red color liquid, the green color liquid and the blue color liquid are applied simultaneously onto the substrate.

3. The process according to claim 1, wherein each said color liquid is dried after it is applied onto the substrate.

4. The process according to any of claims 1 to 3, wherein the green color liquid contains a dye and each of the blue color liquid and the red color liquid contains a pigment.

5. The process according to claim 4, wherein the green color is disposed between the red color and the blue color on the substrate.

6. The process according to claim 1, wherein a color mixing-prevention barrier is provided between the dye-colored segmental layers and between the pigment-colored segmental layers.

7. The process according to claim 1, wherein the gaps between the adjacent color segmental layers is in a range of from 5 to 40 μm.

8. The process according to claim 1, wherein the ink-jet recording head ejects the liquid droplets by utilizing thermal energy, and is provided with a thermal energy converter for generating thermal energy for the liquid droplet ejection.

9. The process according to claim 8, wherein a volume of the ejected liquid droplets is controlled by changing a driving pulse for the thermal energy converter.

10. The process according to claim 1, wherein the substrate has a black matrix on a surface.

11. The process according to claim 10, wherein a resin layer is provided on the surface of the substrate.

12. A process for producing a liquid crystal display panel, comprising the steps of:

applying a red color liquid, a green color liquid, and a blue color liquid onto prescribed spots on a substrate with an ink jet printing head;

drying the deposited liquid on the substrate to form a color filter having a pattern of red, green and blue colors, wherein at least one of the red color liquid, green color liquid and blue color liquid contains a dye, and at least one other of the red color liquid, blue color liquid and green color liquid contains a pigment:

disposing a substrate with picture element electrodes on the substrate with the color filter, providing a gap between the substrates; and filling the gap with a liquid crystal composition.

13. The process according to claim 12, wherein the the red color liquid, blue color liquid and green color liquid are applied simultaneously onto the substrate.

14. The process according to claim 12, wherein each said color liquid is dried after it is applied onto the substrate.

15. The process according to any of claims 12 to 14, wherein the green color liquid contains a dye and each of the blue color liquid and the red color liquid contains a pigment.

16. The process according to claim 15, wherein the green color is disposed between the red color and the blue color on the substrate.

17. The process according to claim 12, wherein a color mixing-prevention barrier is provided at boundary portions between dye-colored segments and pigment-colored segments of the substrate.

18. The process according to claim 17, wherein adjacent color segments are separated by a gap, wherein the gap is in a range of from 5 to 40 μm.

19. The process according to claim 12, wherein the ink jet printing head ejects liquid droplets by utilizing thermal energy, and is provided with a thermal energy converter for generating thermal energy for liquid droplet ejection.

20. The process according to claim 19, wherein a volume of the ejected liquid droplets is controlled by changing a driving pulse for the thermal energy converter.

21. The process according to claim 12, wherein the substrate has a black matrix on a surface.

22. The process according to claim 21, wherein a resin layer is provided on the surface of the substrate.

* * * * *